United States Patent [19]

Rishel

[11] 4,157,964
[45] Jun. 12, 1979

[54] DUPLEX SEAL FOR A BAG-TYPE FILTER SYSTEM

[75] Inventor: John W. Rishel, Vicksburg, Mich.

[73] Assignee: Dover Corporation, Portage, Mich.

[21] Appl. No.: 868,734

[22] Filed: Jan. 10, 1978

[51] Int. Cl.² .............................................. B01D 29/14
[52] U.S. Cl. ..................... 210/238; 55/373; 55/376; 55/378; 55/502; 210/452; 210/484
[58] Field of Search ................ 55/373, 376, 378, 429, 55/498, 502; 210/238, 315, 317, 448, 450, 452, 484

[56] References Cited

U.S. PATENT DOCUMENTS

| | | | |
|---|---|---|---|
| 1,352,961 | 9/1920 | Hills | 210/452 |
| 2,011,031 | 8/1935 | Birch | 210/452 X |
| 2,773,557 | 12/1956 | Engberg | 55/373 |
| 3,771,664 | 11/1973 | Schrink et al. | 210/448 |

Primary Examiner—Frank A. Spear, Jr.
Assistant Examiner—Richard W. Burks
Attorney, Agent, or Firm—Blanchard, Flynn, Thiel, Boutell & Tanis

[57] ABSTRACT

A filter system includes a tank with a removable cover at one end and a filter basket and liner therefor insertable into the tank to divide it into unfiltered liquid and filtered liquid zones. Inlet and outlet openings are disposed at the open and remaining end, respectively, of the tank with the inlet opening being in the side wall of the tank, near such open end, so as not to interfere with opening and closing of the cover. Inner and outer annuli are fixed to the tank side wall and face radially into the tank, with the inlet opening interposed axially therebetween. A spacer insertable into the tank comprises an annular inner disk pressable toward the inner annulus for gripping therebetween an inner resilient seal which in turn engages the adjacent edges of the filter basket and filter liner to prevent leakage therearound between the unfiltered and filtered liquid zones. The spacer includes an outer disk with a radially extending free edge overlying the outer annulus and adapted to support an outer resilient seal between the outer annulus and cover for sealing against liquid leakage from the tank at the cover, such that tightening of the cover onto the tank sealingly compresses the outer resilient seal and through the spacer sealingly compresses the inner resilient seal. The spacer is of open construction permitting liquid communication between the inlet opening to the tank and the open end of the filter liner.

11 Claims, 3 Drawing Figures

DUPLEX SEAL FOR A BAG-TYPE FILTER SYSTEM

FIELD OF THE INVENTION

This invention relates to a seal arrangement for a solid/liquid filter of the type using a basket supported bag.

BACKGROUND OF THE INVENTION

The present invention is an improvement on the filter seal arrangement disclosed in U.S. Pat. No. 3,771,664, assigned to the assignee of the present invention. Such patent is directed to a filter system of the kind in which a filter liner or bag is supported by a perforate basket, in turn housed within a tank and dividing same into unfiltered and filtered liquid zones. The patented system advantageously employs a single, substantially U-cross section resilient seal ring both to seal against liquid leakage between the unfiltered and filtered liquid zones, and to seal against liquid leakage between the tank and cover. To this end an annulus is fixed coaxially atop the open end of the tank below the cover and, in cross section, is provided with two steps, the inner of which supports the open upper end of the basket by means of a flange on said basket and outer of which supports the single U-cross section resilient seal which receives therein the upper edge of the bag and is compressed against the outer step by closure of the cover. This arrangement serves, in addition to the two sealing functions above-mentioned, also to center the basket and bag within the filter tank.

The above-described, patented system has been found quite satisfactory, both operationally and from a commercial acceptance standpoint.

However, the above-described, patented system provides that communication between the interior of the filter liner and the exterior of the tank (i.e., normally communication between the unfiltered liquid zone and a source of liquid to be filtered) be through an inlet conduit fixed to and communicating through the removable cover. In many installations this causes no particular problem, particularly where the need gain access to the interior of the filter tank is infrequent and/or where the inlet piping is such as not to materially hamper removal of the cover.

On the other hand, in some types of installations, the connection of the inlet piping through the cover is a disadvantage, for example under severe filtering conditions where the cover must be opened often to change the filter liner or otherwise service the unit, and where the inlet piping is inaccessible and/or devoid of rapidly disconnectible couplings or the like, or, on the other hand, is not provided with a swivelable or flexible portion which would permit opening of the cover without disconnection of the inlet piping. The present invention is thus directed to, and solves, this problem.

Accordingly, the objects of this invention include provision of:

(1) A filter construction of the bag supporting basket type for liquid/solids filtration in which the tank cover is free of pipe connections for liquid transfer into or out of the tank and is freely removably from and installable on the open end of the tank without disconnection or manipulation of pipe connections to the tank, and without need for access to pipe connections to the tank or special quick disconnect, swivel or flexible sections in said piping.

(2) A filter construction, as aforesaid, capable of use with the same resilient seals, baskets and bags as in the filter structure disclosed in aforementioned U.S. Pat. No. 3,771,664, so as to minimize the size of inventories of parts required for manufacturing and maintenance where filter construction of both types are to be manufactured or used.

(3) A filter construction, as aforesaid, which retains the desirable cover to tank sealing, bag and liner centering, and unfiltered to filtered liquid zone sealing characteristics of the structure disclosed in above-mentioned U.S. Pat. No. 3,771,664 in spite of freeing the tank cover from pipe connections.

Other objects and purposes of this invention will be apparent to persons acquainted with apparatus of this general type upon reading the following specification and inspecting the accompanying drawings.

SUMMARY OF THE INVENTION

The objects and purposes of the invention are met by providing a filter system including a tank with a removable cover at one end and a filter basket and liner therefore insertable into the tank to divide it into unfiltered liquid and filtered liquid zones. Inlet and outlet openings are disposed at the open and remaining end, respectively, of the tank with the inlet opening being in the side wall of the tank, near such open end, so as not to interfere with opening and closing of the cover. Inner and outer annuli are fixed to the tank side wall and face radially into the tank, with the inlet opening interposed axially therebetween. A spacer insertable into the tank comprises an annular inner disk pressable toward the inner annulus for gripping therebetween an inner resilient seal which in turn engages the adjacent edges of the filter basket and filter liner to prevent leakage therearound between the unfiltered and filtered liquid zones. The spacer includes an outer disk with a radially extending free edge overlying the outer annulus and adapted to support an outer resilient seal between the outer annulus and cover for sealing against liquid leakage from the tank at the cover, such that tightening of the cover onto the tank sealingly compresses the outer resilient seal and through the spacer sealingly compresses the inner resilient seal. The spacer is of open construction permitting liquid communication between the inlet opening to the tank and the open end of the filter liner.

DETAILED DESCRIPTION

Figure 1:
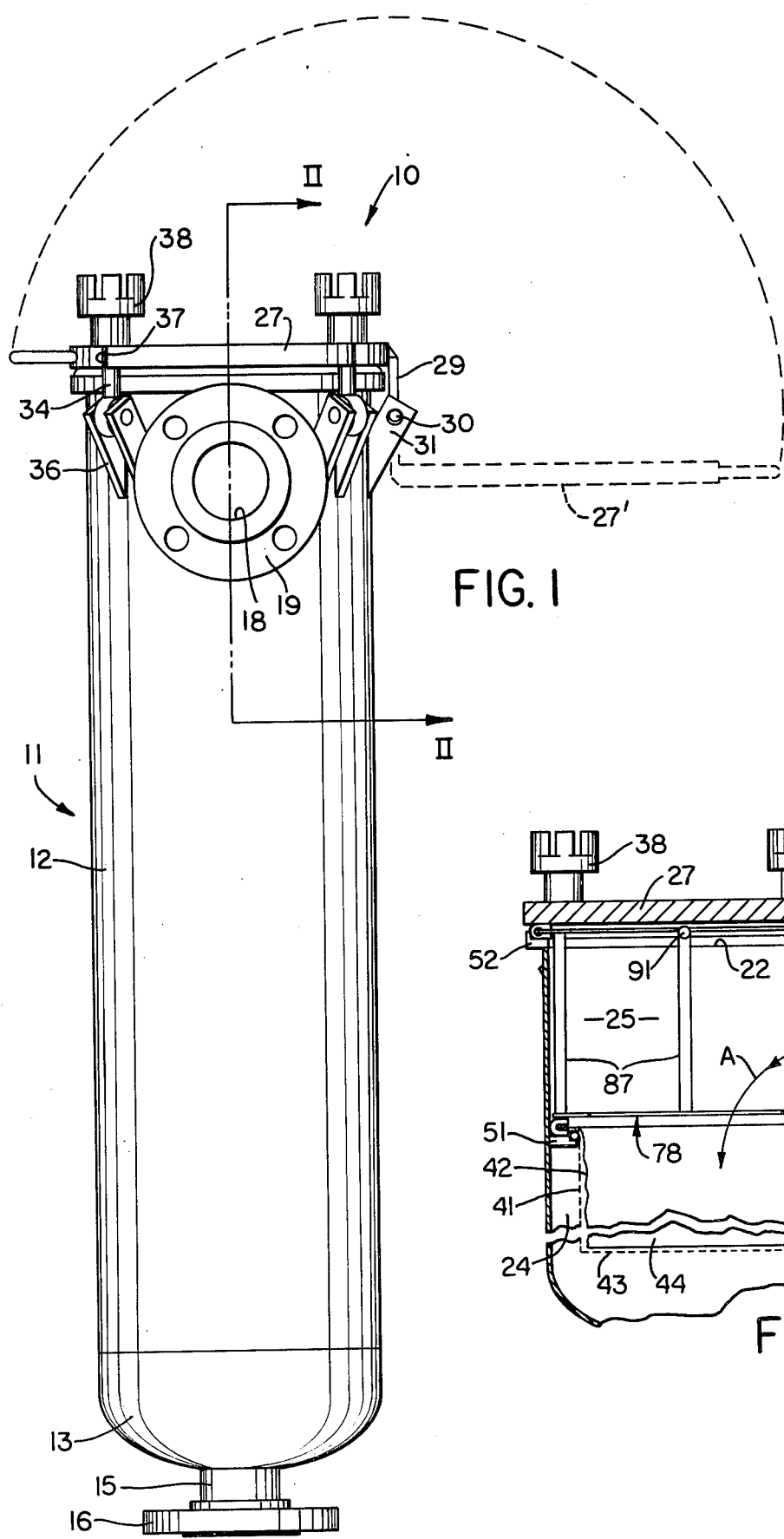
FIG. 1 is a side elevational view of a filter construction embodying the invention showing the cover closed on the tank in solid lines with the ultimate, open position of the cover shown in dotted lines.
Figure 2:
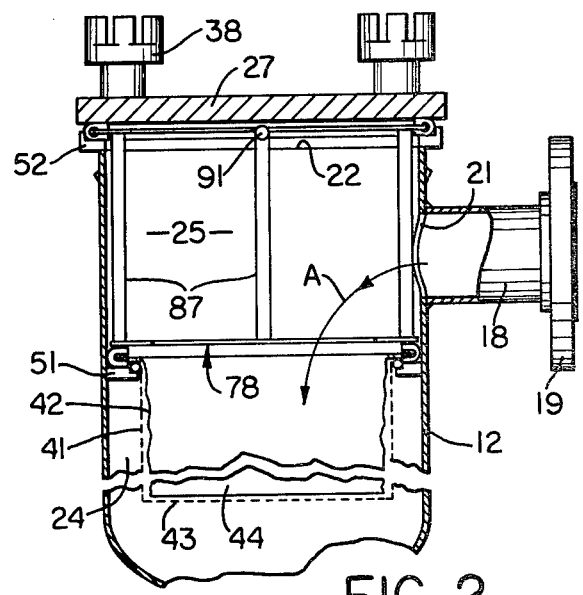
FIG. 2 is a fragmentary sectional view substantially taken on the line II—II of FIG. 1.

The filter construction 10 (FIG. 1) comprises an upstanding tank 11 supported by any convenient means (not shown) and having a cylindrical side wall 12 with its lower end closed by a botton wall 13 through which communicates a liquid flow pipe 15 conventionally flanged at 16 for connection in a liquid flow path. A further liquid flow pipe 18 (FIGS. 1 and 2), conventionally flanged at 19 for connection in such liquid flow path, communicates through the tank side wall 12, through the hole therein indicated at 21 (FIG. 2). The hole 21 is located near the open upper end 22 of tank 12. While the present invention, at least in its broader aspects, is not limited to any particular direction of flow through the filter construction 10, in the embodiment shown, pipe 15 communicates with a filtered liquid zone 24 (FIGS. 2 and 3) within the tank and may be termed the outlet pipe, while pipe 18 communicates with an unfiltered liquid zone 25 within the tank and may be termed the inlet pipe.

A removable cover 27 (FIGS. 1 and 2) normally is positioned to overlie and close the open upper end 22 of tank 12. The cover 27 may be secured by any convenient means and, in the embodiment shown, has a dependent edge extension 29 (FIG. 1) fixed thereto as by welding and pivotally supported at 30 on brackets 31 fixed to side wall 12 of tank 11 near its upper end, for pivoting of cover 27 between its closed position shown in solid lines and its open position shown in broken lines at 27'. To clamp cover 27 in its closed position shown, clamp bolts 34 (FIG. 1) are pivotally supported on brackets 36 circumferentially distributed around and fixed to tank side wall 12 near its upper end. Clamp bolts 34 swing upward and radially into radial slots 37 appropriately circumferentially spaced in cover 27 and upon tightening of nuts 38 thereon secure cover 27 in closing relation at the top of the open upper end 22 of tank 11. Cover 27 is released for opening by loosening nuts 38 and thereafter swinging bolts 34 radially outwardly and downwardly out of slots 37 and out of contact with cover 27.

Within the tank 11 a perforate cylindrical filter basket 41 (FIGS. 2 and 3) is coaxially supported below inlet pipe 18, and in turn supports therewithin a baglike filter liner 42. Basket 41 and liner 42 are here open at their upper ends and closed at their bottom ends 43 and 44 (FIG. 2), respectively. The filter liner 42 is normally a fabric of desired material and of such mesh as to provide whatever filtering function is required for a given installation. The perforated basket 41 provides mechanical strength and backing for the filter liner which lies snugly against the filter basket in a known manner and is centered precisely with respect to the filter basket, to avoid a creation of folds in the liner or spacing of the liner from the basket as may result from eccentric positioning.

Turning now to the seal structure of the present invention, axially inner and outer annuli 51 and 52 (FIG. 3) are rigidly and coaxially fixed to tank side wall 12, as by welding, and face rigidly into the tank. Annuli 51 and 52 are axially spaced apart, axially inboard and outboard, respectively, of liquid inlet opening 21.

Inner annulus 51 is an annular disk with its radially outer edge fixed against the inside face 54 of tank side wall 12 and has a flat axially outward (here upper) face 56 relieved at its radially inner edge to form an upward and radially inward facing step 57. The upper face 56 of annulus 51 and the adjacent portion of tank side wall inside face 54 immediately thereabove may be considered to form a further upward and radially inward facing step.

Outer annulus 52 is substantially of L-shaped cross section preferably integrally formed by a flat radially extending disk-like portion 59 with an annular flange 60 extending axially upward from the radially outer edge of annular disk 59, to form therewith an upward and radially inward facing step 61. In the preferred embodiment shown, the radially inner edge 63 of annulus 52 does not extend radially inward beyond inside face 54 of tank side wall 12. The annulus 52 here shown is fixed atop the upper edge 22 of tank side wall 12. The cover 27 in its closed position shown in FIG. 3 overlies outer annulus 52.

The filter basket 41 has conventionally fixed to its upper end an outwardly projecting flange 65. Flange 65 is supported atop step 57 of annulus 51 and is snugly radially bounded thereby to accurately locate basket 41 coaxially within tank 11 with the perforate side wall of basket 41 extending loosely down through the central opening of annulus 51, as shown in FIG. 3.

A resilient annular seal 68 (FIG. 3) is of substantially U-shaped, radially inwardly opening cross section, which may conveniently be at least similar to the seal ring disclosed in the aforementioned U.S. Pat. No. 3,771,664. In cross section, the radially inward facing slot 69 between the legs of the U-shape is enlarged at its blind end to form a substantially circular cross section recess 71. The seal 68 is of an elastomeric material, such as Buna-N. As in the aforementioned patent, liner 42 is connected at its upper end firmly to a ring 72, in any convenient manner, such as by folding the upper edge of the liner over and around the ring and returning same for fastening as at 74, such as by stitching, heat sealing, or otherwise, according to the nature of the material of the liner. Ring 72 is of any convenient material, preferably a slightly compressible rod or tube or a metallic spring formed into a ring. The liner 42 thus affixed to ring 72 in any desired manner, and ring 72 is radially outwardly inserted into the slot of the U-cross section annular seal 68 for snug reception into the enlarged, circular recess 71, as shown in FIG. 3, to provide an integral liner-seal unit 42, 68, conveniently similar to the liner-seal unit of aforementioned U.S. Pat. No. 3,771,664.

Figure 3:
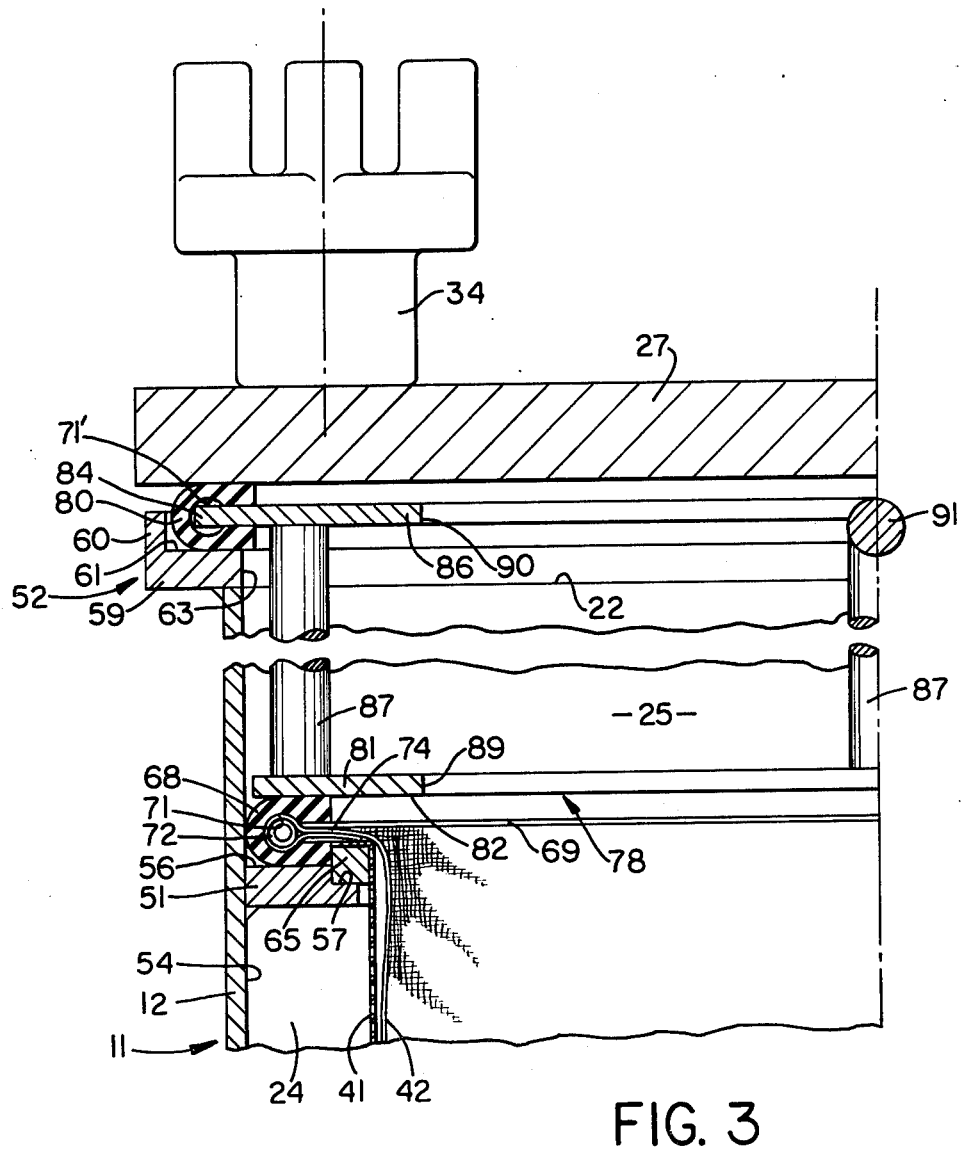
FIG. 3 is an enlarged fragment of FIG. 2.

With basket 41 supported on the step of annulus 51 by its flange 65 as shown in FIG. 3, seal 68 is sized in cross section to lie closely radially between flange 65 and tank inside face 54 but without requiring deformation of its cross section to achieve insertion between flange 65 and face 54. The unstressed radius of seal ring 68 is such that no significant circumferential stretching or compressing of ring 68 is required to fit it around flange 65 or within tank side wall 12. With basket 41, liner 42 and seal 68 here supported atop annulus 51 as seen in FIG. 3, it will be noted that all are below the portion of tank side wall occupied by inlet opening 21 and are well spaced below the open upper end of tank 11 and overlying cover 27. As shown in FIG. 3, annulus 51 and seal ring 68 cooperate to coaxially locate basket 41 and liner 42 within tank 11 in such manner that the liner lies smoothly and close spaced to the inside surface of supporting basket 41, for maximum filtering efficiency.

A spacer member 78 is insertable into the open end of tank 11 and cooperates with seal ring 68 and a further seal ring 80 (FIG. 3), upon closure of cover 27 and tightening of nuts 34, to seal against leakage of liquid out of the tank past cover 27 and simultaneously to seal against leakage between the filtered and unfiltered zones 24 and 25. More particularly, the spacer 78 has an axially inner end portion 81 preferably formed as a flat annular disk as shown, of diameter slightly less than the inside diameter of tank 11 for free insertion thereinto to bring the lower surface 82 of annular disk 81 to rest atop the seal 68. At its upper end, spacer 78 has a radially extending free edge 80 of diameter greater than the inside diameter of the tank 11 and receivable loosely in the step 61 of outer annulus 52. In the preferred embodiment shown, the radial free edge 84 is the radially outer edge of a further annular disk 86 fixed to and coaxially spaced above disk 81 by plural evenly circumferentially spaced posts 87 fixed thereto as by welding. In the preferred embodiment shown, four such posts are provided.

The seal 80 is preferably identical at least in cross section to seal 68. Preferably the seals 68 and 80 are identical, with seal ring 80 being stretched circumferentially sufficient to snap it over radial free edge 84, as shown in FIG. 3, such that the radial free edge 84 is received within the slot of the U-shaped cross section of the seal ring and within the recess 71' thereof. When thus disposed on the radial free edge 84, seal 80 has its radially outer edge closely bounded by upstanding flange 60 of annulus 52 and seal 80 rests coaxially atop step 61 of annulus 52 with lower surface 82 of the spacer member resting atop seal 68. Under these conditions, seal 80 extends above flange 60 and the cover 27 in its closed, but untightened, position shown rests in turn atop seal 80 as shown.

Upon tightening of the nuts 34, cover 27 presses seal ring 80 against the surfaces of step 61 while causing the seal 80 to simultaneously grip the radial free edge 84 of the spacer to prevent liquid leakage from the tank out past the cover. At the same time cover 27, through the upper leg of U-cross section seal 80, presses the entire spacer downward and thereby presses the lower surface 82 thereof snugly against the seal 68, compressing same between the inner end of spacer 78 and upper face 56, wherein any radial expansion of seal 68 tends to urge it more firmly into contact with the inside face 54 of tank side wall 12 and the opposed face of basket support ring 65. Also at the same time, the walls of recess 71 and seal 68 tend to press the turned over edge portion of the liner tightly against ring 72 to positively prevent leakage between the zones 24 and 25 along either the inside or the outside cross sectional surfaces of seal ring 68. Accordingly, tightening down of cover 27, through spacer 78, provides a double sealing effect at two axially spaced locations within the tank to prevent leakage out of the tank and leakage between zones 24 and 25.

The central opening 89 of lower spacer ring 81 and the circumferential spacing between posts 87 provides a free passage for incoming unfiltered liquid, passing same from inlet opening 21 down into the interior of the cylindrical filter liner 42, along the direction of arrow A in FIG. 2.

Upon release of nuts 38 and radially outward pivoting of bolts 34, followed by opening of cover 27, the interior condition of liner 42 can be visually inspected simply by looking downward through the central openings 89 and 90 (FIG. 3) of spacer disks 81 and 86, respectively. Should it be desired to remove the liner-seal units 42, 68, alone or with basket 41, the spacer 78 with seal 80 is readily removable from the tank simply by an upward lifting motion. To permit easy one-handed removal, a diametral crossbar 91 (FIG. 3) is preferably secured by welding diametrally across central opening 90 to the upper spacer disk 86, the upper surface of crossbar 91 being at least no higher than the top surface of spacer disk 86 to avoid interference with tightening down of cover 27.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a filter construction including a filter tank having an open end and a cover securable on said open end, a filter basket and filter liner lining said basket and disposed within said tank for dividing said tank into an unfiltered liquid zone and a filtered liquid zone, inlet conduit means communicating with said unfiltered liquid zone and further conduit means communicating with said filtered liquid zone, and means for centering said filter liner with respect to the filter basket and for sealing both against bypassing of unfiltered liquid around the edge of the filter liner and against leakage of liquid from within the tank between said open end and cover, the improvement comprising:

means defining a hole through the side wall of said tank near said open end for liquid communication between said tank and one of said conduit means;

first and second step defining annuli coaxially fixed to and facing into said tank, said first and second annuli being disposed axially inboard and outboard, respectively of said hole in said side wall;

a first resilient seal around the edge of said liner received snugly in a step of said first annulus and facing toward said second annulus;

a spacer insertable in said open end of said tank, said spacer having inner surface means engageable with said first resilient seal for axially pressing said first resilient seal firmly against said liner edge and first annulus, said spacer having a free radial edge axially offset from said inner surface means and overlying said second annulus;

a second resilient seal around said free radial edge of said spacer received snugly in a step of said second annulus;

said cover having inner surface means engageable with said second resilient seal for axially pressing said second resilient seal firmly against said free radial edge of said spacer and said second annulus, to thereby press said spacer firmly against said liner edge and first annulus, said spacer including an opening communicating between said hole and said liner.

2. The device of claim 1, in which said free radial edge of said spacer projects radially beyond said inner surface thereof and the inside diameter of said second annulus is intermediate the diameter of said free radial edge portion of said spacer and the diameter of the remaining portion of said spacer disposed axially inboard of said free radial edge, such that said spacer is insertable into the open end of said tank up to the point of axial interference between said free radial edge and said second annulus.

3. The device of claim 1, in which said second annulus is disposed at said open end of said tank.

4. The device of claim 3, in which said second annulus is of substantially L-shaped cross section, comprising an annular disk fixed to the open end of said tank without overhanging the interior of the tank, and having an annular flange at its radially outer edge and extending axially away from said tank and toward said cover, the total axial thickness of the uncompressed second resilient seal and spacer free radial edge being more than the height of said annular flange, and including means connecting said cover to said tank and actuable for compressing said second resilient seal axially between said cover, free radial edge and annular disk, and radially between said flange and said free radial edge, to prevent leakage from said tank.

5. The device of claim 1, in which said first annulus is an annular disk fixed to the inside face of the tank side wall in axially spaced relation from said tank open end, said annular disk having an axially outward facing surface engageable by said first resilient seal.

6. The device of claim 5, including an annular step in the radially inner portion of said axially outward facing surface of said annular disk, said filter basket being readily insertable through said first annulus and having a radially outward projecting flange at an open end thereof for radially snug seating in said annular step of said first annulus, said flange of said filter basket projecting axially out of said annular step inboard of said first resilient seal and being overlaid by the edge portion of said filter liner for sealingly pressing said first resilient seal between said annular step and spacer and radially against the interior surface of the tank side wall.

7. The device of claim 1, in which said spacer comprises coaxial outer and inner disks, at least said inner disk being annular, and a plurality of circumferentially spaced axial members connecting said outer and inner disks to form a rigid spacer, said opening communicating between said hole and said liner extending between said disks intermediate a pair of said axial members and thence through the central portion of said inner annular disk.

8. The device of claim 7, in which said outer disk is also annular, the outer radial edge of said outer annular disk being said free radial edge of said spacer and extending radially out-board of said inner annular disk.

9. The apparatus of claim 1, in which said first and second resilient seals are of at least similar, radially inward opening, U-shaped cross section for respectively radially receiving therein said free radial spacer edge and said liner.

10. The device of claim 9, in which said first resilient seal has, in cross section, an enlarged recess near the bight of its U-shaped cross section, which recess is of larger cross sectional dimension than the space between the free ends of said U-shaped cross section, and including a ring for holding the outer edges of the filter liner and receivable into said recess whereby said liner, ring and first resilient seal provide an integrated unit for quick assembly with respect to said basket by placement of a radially outwardly extending flange at the open end of said filter basket in a step in the radially inner edge of said first annulus followed by placement of said first resilient seal on said first annulus radially outboard of said step.

11. The device of claim 10, in which both said ring and said first and second resilient seal are of compressible material.

* * * * *